United States Patent
Dutt et al.

(10) Patent No.: US 12,271,878 B1
(45) Date of Patent: Apr. 8, 2025

(54) SYSTEM FOR GENERATION OF SMART CONTENT

(71) Applicant: INTUIT INC., Mountain View, CA (US)

(72) Inventors: Bala Dutt, Bangalore (IN); Prabhat Hegde, Bangalore (IN); Ajay Karthik, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 16/180,268

(22) Filed: Nov. 5, 2018

(51) Int. Cl.
*G06Q 20/14* (2012.01)
*G06N 20/00* (2019.01)

(52) U.S. Cl.
CPC ............. *G06Q 20/14* (2013.01); *G06N 20/00* (2019.01)

(58) Field of Classification Search
CPC .......... G06Q 30/04; G06Q 30/40; G06F 8/38; G06F 17/243; G06F 40/18; G06F 16/36; G06N 20/00
See application file for complete search history.

(56) References Cited

U.S. PATENT DOCUMENTS

| | | | | |
|---|---|---|---|---|
| 2009/0043689 A1* | 2/2009 | Yang | ..................... | G06Q 20/102 705/38 |
| 2011/0040604 A1* | 2/2011 | Kaib | ..................... | G06Q 30/02 705/347 |
| 2011/0196786 A1* | 8/2011 | Lacerte | ................ | G06Q 20/102 705/40 |
| 2014/0013212 A1* | 1/2014 | Von Haden | ........... | G06F 40/186 715/243 |
| 2014/0188577 A1* | 7/2014 | Gerber | ............... | G06Q 10/1091 705/7.42 |
| 2015/0142545 A1* | 5/2015 | Ceribelli | ............ | G06Q 30/0222 705/14.23 |
| 2016/0292283 A1* | 10/2016 | Vishwanath | ........ | G06F 16/9535 |
| 2018/0052665 A1* | 2/2018 | Kaur | ..................... | G06F 16/972 |
| 2018/0089159 A1* | 3/2018 | Jain | ......................... | H04L 67/06 |
| 2018/0107734 A1* | 4/2018 | Galia | ...................... | G06F 16/36 |
| 2018/0144042 A1* | 5/2018 | Sheng | ..................... | G06F 16/93 |
| 2018/0278665 A1* | 9/2018 | Maruskin | ......... | H04N 21/44222 |
| 2019/0034976 A1* | 1/2019 | Hamedi | ............. | G06Q 30/0243 |
| 2020/0104353 A1* | 4/2020 | Chua | ..................... | G06F 16/337 |

* cited by examiner

*Primary Examiner* — Calvin L Hewitt, II
*Assistant Examiner* — Amanulla Abdullaev
(74) *Attorney, Agent, or Firm* — Patterson + Sheridan, LLP (57) ABSTRACT

Certain aspects of the present disclosure provide techniques for providing smart content to a user of an application. Embodiments include receiving a request from a client for content. The request may include context data. Embodiments include identifying a content template for the content based on the request. Embodiments include identifying a rule associated with the content template. Embodiments include evaluating the rule based on the context data in order to determine a value of a variable. Embodiments include generating personalized content based on the content template and the value of the variable. Embodiments include providing the personalized content to the client.

12 Claims, 5 Drawing Sheets

SYSTEM FOR GENERATION OF SMART CONTENT

INTRODUCTION

Aspects of the present disclosure relate to techniques for generating smart content. In particular, embodiments described herein involve using context data to personalize content based on rules.

BACKGROUND

Most applications allow for the exchange of content of some sort that is consumed by users or machines. For example, financial services applications generally involve content such as invoices, estimates, reports, forms, help content, and other types of content. Content providers, such as businesses, may generate content that is provided to users, such as through a user interface or via email, or that is used in automatic processes, such as in the generation of invoices.

Aspects of content may vary based on changing circumstances, such as geographic location, language, device capabilities and/or characteristics, user attributes, date and time, and other factors. For example, a content provider may generate multiple versions of a particular form to provide to users under different circumstances, such as based on where a user is located or whether the user is a small or large business. For applications with a large user base, content generation can be a time-consuming and inefficient process. Generating separate versions of content for different segments of users or, in some cases, for individual users, may require a significant amount of time and resource utilization. Furthermore, providing users with generic, non-personalized content may result in an inconvenient or impersonal experience for the user, which may cause the user to consider other software and service providers.

Accordingly, there is a need for improved techniques of providing users with "smart content" that is personalized and context-sensitive.

BRIEF SUMMARY

Certain embodiments provide a method for providing smart content to a user of an application The method generally includes: receiving a request from a client for an invoice, wherein the request comprises context data; identifying an invoice template for the content based on the request; identifying metadata associated with a plurality of templates, the plurality of templates comprising the invoice template; interpreting the metadata to derive a rule associated with the plurality of templates; evaluating the rule based on the context data in order to determine a value of a variable; generating a personalized invoice based on the invoice template and the value of the variable; and providing the personalized invoice to the client.

Other embodiments provide a non-transitory computer-readable medium comprising instructions that, when executed by one or more processors, cause the one or more processors to perform a method for providing smart content to a user of an application. The method generally includes: receiving a request from a client for an invoice, wherein the request comprises context data; identifying an invoice template for the content based on the request; identifying metadata associated with a plurality of templates, the plurality of templates comprising the invoice template; interpreting the metadata to derive a rule associated with the plurality of templates; evaluating the rule based on the context data in order to determine a value of a variable; generating a personalized invoice based on the invoice template and the value of the variable; and providing the personalized invoice to the client.

Other embodiments provide a system comprising one or more processors and a non-transitory computer-readable medium comprising instructions that, when executed by the one or more processors, cause the one or more processors to perform a method for providing smart content to a user of an application. The method generally includes: receiving a request from a client for an invoice, wherein the request comprises context data; identifying an invoice template for the content based on the request; identifying metadata associated with a plurality of templates, the plurality of templates comprising the invoice template; interpreting the metadata to derive a rule associated with the plurality of templates; evaluating the rule based on the context data in order to determine a value of a variable; generating a personalized invoice based on the invoice template and the value of the variable; and providing the personalized invoice to the client.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for providing smart content to a user of an application.

Applications generally allow users to access content of various types. A user may access content developed by a content provider, such as a business, through interaction with an application. Content may include text, images, audio, video, and various other forms of data. Different users may access content under a variety of different circumstances, such as through different types of client devices, on different days, at different times, and with different purposes. Accordingly, embodiments of the present disclosure involve generating smart content that is automatically adapted for different users and different circumstances based on context data. Smart content, as described herein, allows content providers to generate dynamic content that is personalized for individual users under particular circumstances without requiring the content providers to manually generate separate instances of content. It is noted that smart content is sometimes referred to herein as personalized content.

For instance, a content provider may generate a content template for a particular item of content, and may annotate the content template with rules that determine how the content is to be personalized based on context data. Context data generally refers to data that indicates user attributes, device capabilities and/or characteristics, date and time, and other information related to the context within which the content is accessed. In some embodiments, a rule may be associated with multiple content templates, such as through metadata (e.g., which may include one or more annotations) associated with multiple content templates. When a user requests an item of content, such as through a user interface of an application, context data that identifies a context of the request is used to automatically adapt the item of content for the user based on rules associated with a content template. For example, the application may send a request for content to a server along with context data, and the server may use the content template and the rules, based on the context data, to generate and provide "smart" or personalized content for the user to the application.

Techniques described herein constitute an improvement with respect to conventional industry practices, such as providing users with static content or requiring content providers to manually generate different versions of content for different contexts, as they allow for personalized, context-sensitive content to be automatically and efficiently provided to users. Using content templates associated with rules to automatically adapt content based on context data allows for an improved user experience (e.g., by providing users with personalized, context-sensitive content) and an improved content development process (e.g., by allowing content providers to generate a single version of an item of content that will be automatically adapted for different contexts). Furthermore, embodiments of the present disclosure allow for a more efficient usage of resources, such as by storing and transmitting a single instance of an item of content that is automatically adapted for different contexts instead of storing and transmitting multiple variations of the same item of content. Additionally, techniques described herein improve the effectiveness of content, such as by providing content to a user in a form that is most likely to cause the user to interact with the content (e.g., pay an invoice or initiate a transaction). Techniques described herein also improve the functioning of computing devices and provide improved user interfaces by automatically adapting content for display to a user based on device characteristics of a device through which the user accesses the content.

Embodiments of the present disclosure further improve processes related to generating and providing content to users by allowing for content providers to define rules that are shared across items of content and among different content providers. For example, rules may be shared in a community fashion, and content providers may select rules to apply to their content templates. A single rule may be associated with a plurality of content templates. For example, a legal department of a content provider may define rules related to laws and/or regulations that are automatically applied to content templates that mean certain characteristics, such as being associated with a particular geographic region. As such, techniques described herein allow for improved creation of dynamic content.

Example Computing Environment

Figure 1:
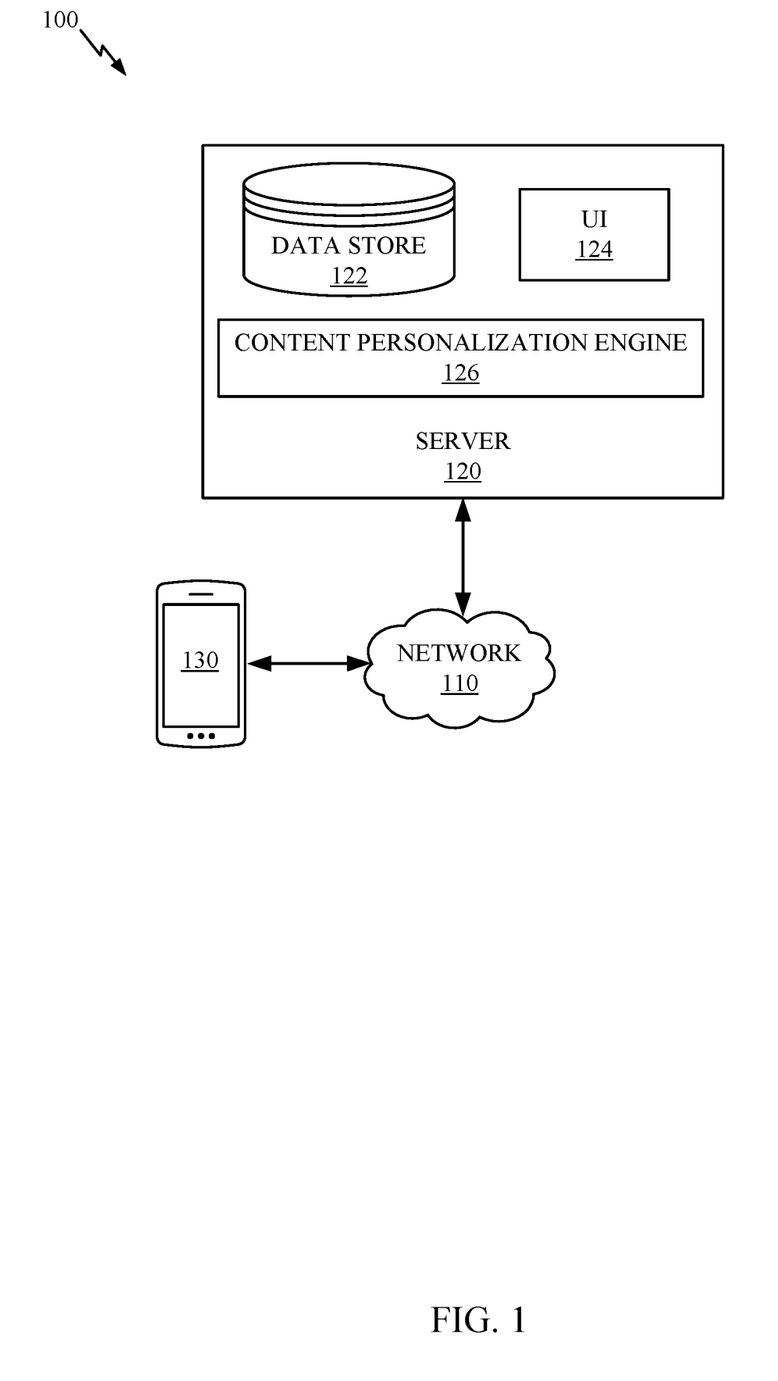
FIG. 1 depicts an example computing environment in which embodiments of the present disclosure may be implemented.

FIG. 1 illustrates an example computing environment 100 in which embodiments of the present disclosure may be implemented.

Computing environment 100 includes a server 120 that communicates with a client 130 over a network 110 in order to provide a user of an application with personalized, context-sensitive content. Server 120 is representative of a computing device, such as a rack server or desktop computer, that hosts content and allows a content provider (e.g., a business), to define content templates and associated rules for personalizing content based on context. Server 120 includes data store 122, which represents one or more data storage entities that store data related to content. In some embodiments, data store 122 stores content templates and associated rules, such as in the form of annotations to the content templates. Data store 122 may also store content that is used to populate the content templates.

A content template generally defines the structure of an item of content, and includes references to content and variables that determine aspects of how output content is generated based on the content template. For example, a content template for a help file may define a structure of the help file (e.g., characteristics and positions of items, such as images and segments of text, in the help file), and may include variables such as visibility indicators (e.g., indicating whether or not a certain item should be displayed in the help file), placeholders for text or other content (e.g., a variable may determine what text is included in a certain item, such as a context-specific numerical value or a gender-specific title), font and size variables (e.g., that determine the font and size of certain items of text in the help file), and other types of variables.

Variables in a content template may be associated with rules that are used to determine values for the variables based on context data. For example, a content provider may specify a rule (e.g., by providing an annotation to an invoice template via user interface 124) that the total amount due on an invoice should be shown in a red font if the due date for the invoice has passed. When a user requests the invoice (e.g., via client 130), context data associated with the request will be used to evaluate the rule by comparing a date in the context data with a due date of the invoice. If it is determined that the date of the request is greater than the due date of the invoice, then a font color variable for the total amount due in the invoice template for the invoice is set to the value of "red" according to the rule.

Rules may be associated with content templates in a variety of different ways. For example, a rule may be specified in metadata associated with a content template, such as an annotation that defines the rule (e.g., in a domain specific language or in natural language) and includes a reference to the content template (e.g., an identifier of the content template may be included in the metadata). In other embodiments, an identifier of the metadata may be included in the content template. In other embodiments, a separate mapping of content templates with metadata or rules may be included in a separate file. In other embodiments, rules may be dynamically associated with content templates, such as based on conditions specified in the rules. In one example, metadata including a rule specifies that the rule applies to all content templates of a certain type or that relate to a certain geographic region. As such, content personalization engine 126 may automatically identify the metadata as being associated with a particular content template if the content template meets the condition(s) specified in the metadata (e.g., if the content template is of the certain type or relates to the certain geographic region). As such, rules may be shared among content templates and content providers.

Server 120 includes a user interface (UI) 124 through which a user, such as a content provider, defines content templates and rules. In some examples, UI 124 provides a drag-and-drop interface that a content provider uses to build content templates and add annotations to the content templates in order to define rules. In other embodiments, UI 124 provides a coding environment, development environment, or some other interface for uploading content templates and rules developed separately from UI 124, such as using other applications (e.g., separate financial services applications).

In some embodiments, UI 124 allows a content provider to add annotations to a content template using a domain-specific language (DSL) for defining rules. A DSL generally refers to a computer language that is specialized to a particular application domain. For example, a DSL may include certain keywords and syntax for defining rules related to content templates, such as "IF (X<5), THEN (X.VISIBILITY=TRUE)". In other embodiments, a content provider may define rules by adding annotations to a content template in natural language, such as "if X is less than 5, then X is visible." Content personalization engine 126 (or a separate interpretation component) interprets annotations in order to determine rules. For example, content personalization engine 126 may use natural language processing (NLP) techniques to derive rules from natural language annotations, such as by using known rules of syntax and grammar to parse an annotation and determine a rule. In some embodiments, content personalization engine 126 may interpret a DSL used in an annotation to determine a rule (e.g., content personalization engine 126 may be configured to parse the DSL in order to determine rules). In some embodiments, annotations are stored in content templates, while in other embodiments annotations are stored separately from but associated with content templates. For example, a content template may include references to annotations that are stored separately or an annotation may include a reference to a content template that is stored separately.

While a single UI 124 is shown in FIG. 1, it is noted that content templates and rules may also be defined, modified, and shared, by other devices and user interfaces. Furthermore, rules may be shared among a plurality of content templates, such as through metadata that is associated with multiple content templates. For example, multiple content providers and/or multiple individuals associated with a single content provider may contribute to and share content templates and rules, such as over network 110. In one example, a graphic designer defines a content template through UI 124, a marketing professional defines certain rules for the content template through a separate (or the same) UI, and a legal professional defines additional rules for the content template through a separate (or the same) UI. For instance, the marketing professional may define rules that relate to how the content is formatted and displayed to a particular user and the legal professional may define rules related to compliance with laws and regulations, such as whether or not to display a disclaimer in certain geographic regions. As such, techniques described herein allow for content templates and rules to be generated in a collaborative manner in order to improve the accuracy and efficiency of smart content development.

Network 110 may be any sort of data communication network capable of carrying data between user devices, such as client 130, and server 120. For example, network 110 may be a local area network, wide area network, cellular network, ad-hoc network, near-field communication network, the Internet, or any other known or later developed network.

Client 130 represents one or more computing devices associated with a user (e.g., a customer of a business). Client 130 may comprise any form of electronic devices capable of running applications and communicating data over a network interface. For example, client 130 may include one or more smartphones, tablet computers, laptop computers, smart wearable devices, servers, desktop computers, and other electronic devices. In some embodiments, client 130 runs an application that is used to access content over network 110. For example, a user may operate a financial services application on client 130 to access content such as invoices and financial records.

In certain examples, client 130 sends a request for content over network 110 to server 120. In certain embodiments, client 130 determines context data related to the request and includes the context data with the request sent to server 120. For example, context data may include a date and time of the request, user attributes (e.g., user business type, length of use, age, gender, geographic location, birthday, and other attributes of the user), user preferences (e.g., content formatting and display preferences, types of content that the user prefers to view, and other preferences), device capabilities and/or characteristics of client 130 (e.g., device type, operating system, screen size, resolution, connection speed, and other device parameters), and others. In certain embodiments context data includes a user identifier associated with the user, which server 120 uses to retrieve user attributes and/or user preferences (e.g., from a local or remote user profile data store). In some embodiments, client 130 prompts the user to specify a content format (e.g., file type), such as through a user interface, and also includes the specified content format with the request.

Server 120 receives the request from client 130 and identifies a content template based on the request. For example, the request may include a content identifier, and the content identifier may also be stored with the content template in data store 122.

Content personalization engine 126 generates personalized content for the user based on the request by determining rules associated with the content template and evaluating the rules based on the context data received with the request. For example, the content template may include variables, and the values of the variables may be determined by evaluating rules associated with the content template based on subsets of the context data.

In one example, content personalization engine 126 populates the content template with specific content based, at least in part, on the determined values of the variables, thereby producing personalized content based on the request. Generating personalized content may involve mutating aspects of the content. For example, content personalization engine 126 may modify the size and positioning of items in the content template according to rules that are evaluated based on the context data. In one example, content is formatted differently based on device characteristics in the context data.

In certain embodiments, machine learning models may be used in generating personalized content. For example, a rule associated with a content template may specify that a variable in the content template is determined based on the output of a machine learning model, such as a model trained to predict a value most likely to elicit a positive user response. In one example, a machine learning model is trained based on records of historical user interactions with invoices to determine the ideal position of the total amount due on an invoice for a particular user, such as based on which position is correlated with historical invoices being paid quickly by users that share certain user attributes with the particular user.

Machine-learning models allow computing systems to improve and refine functionality without explicitly being programmed. Given a set of training data, a machine-learning model can generate and refine a function that determines a target attribute value based on one or more input features. For example, if a set of input features describes an automobile and the target value is the automobile's gas mileage, a machine-learning model can be trained to predict gas mileage based on the input features, such as the automobile's weight, tire size, number of cylinders, coefficient of drag, and engine displacement.

The predictive accuracy a machine-learning model achieves ultimately depends on many factors. Ideally, training data for the machine-learning model should be representative of the population for which predictions are desired (e.g., unbiased and correctly labeled). In addition, training data should include a large number of training instances relative to the number of features on which predictions are based and relative to the range of possible values for each feature.

In certain embodiments, a machine learning model is trained using training inputs of context data and training outputs that include a variable value that resulted in a positive outcome (e.g., a user buying a product, paying an invoice, accessing additional content, or other positive outcomes) for each of a plurality of combinations of context data. When a user requests content, aspects of the context data that are sent with the request for content are provided as inputs to the machine learning model, which outputs a value for a variable (e.g., a font color that is historically associated with users purchasing products in similar contexts). As such, machine learning models may be used in the process of generating personalized content for a user based on context data.

Once content personalization engine 126 generates personalized content, it is provided to client 130 for rendering and display to the user. In other embodiments, personalized content is rendered by server 120 before it is sent to client 130 (e.g., a final output screen including the personalized content may be generated by server 120 and provided to client 130 for display). The personalized content may, for example, be displayed to the user via a user interface of an application running on client 130. In other examples, the personalized content is sent to the user, such as via email. The personalized content may be a file that the user can open, download, and print. In certain embodiments, the personalized content is provided to the user in a file format specified by the user. In one example, the personalized content is a tax form that is populated with data determined for the user based on context data. In another example, the personalized content is an invoice that is populated, formatted, and otherwise modified based on context data. In one example, client 130 is a mobile phone, and the personalized content is provided in a form that is easily readable on a mobile phone, as determined based on context data. As such, the user is provided with a personalized version of the content that is automatically generated based on context data, while the content provider only had to develop a single content template with associated rules.

Notably FIG. 1 is depicted with a selected group of features for clarity and simplicity, but there may be many additional elements of computing environment 100. Furthermore, certain functions described as being performed by server 120 may alternatively be performed by client 130. In some embodiments, for example, content personalization engine 126 is located on client 130, and personalized content is generated locally by client 130, such as based on content templates and associated rules stored on client 130 or remotely on server 120.

Example Data Flow

Figure 2:
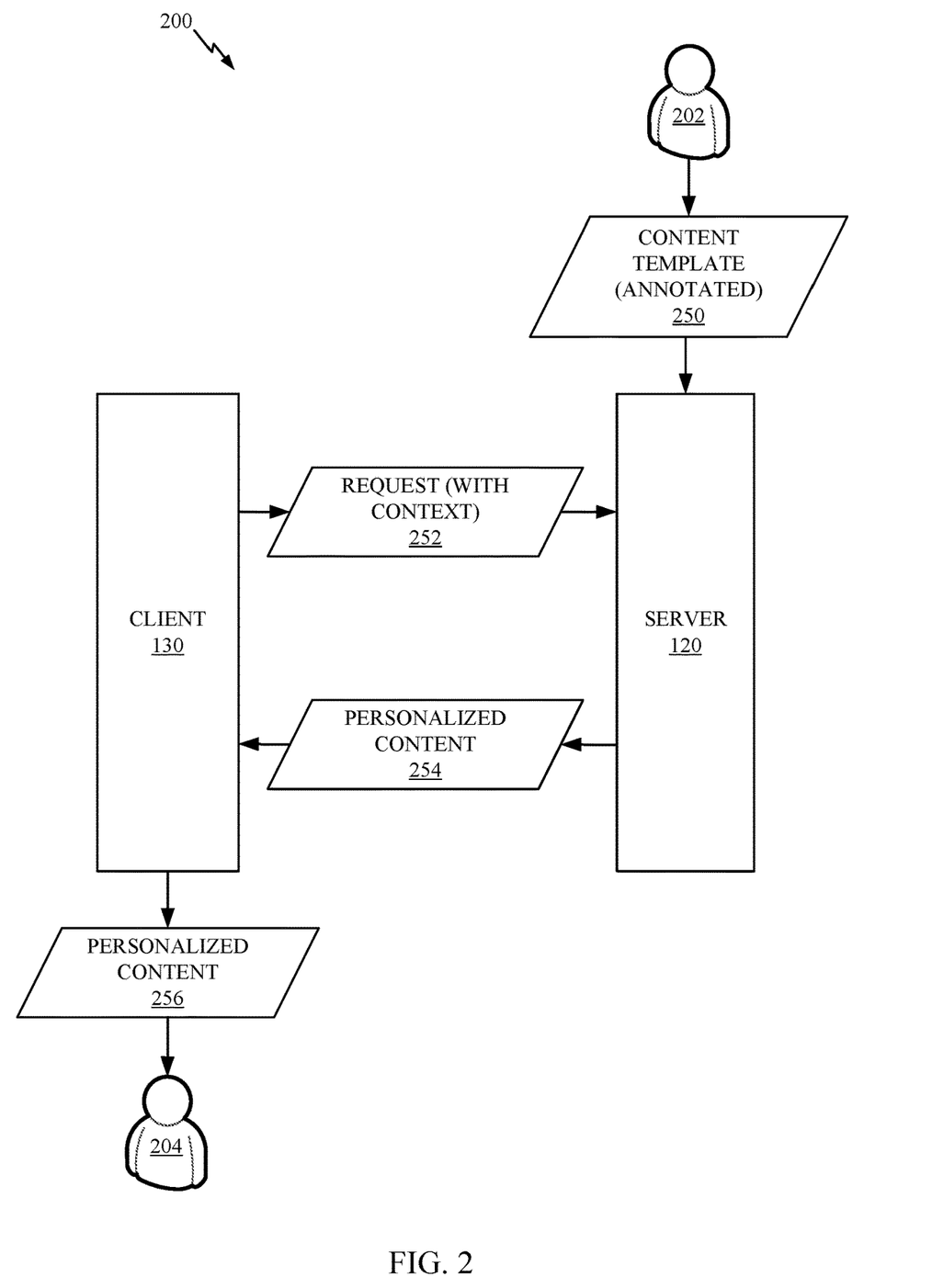
FIG. 2 depicts an example of providing smart content to a user of an application.

FIG. 2 depicts an example data flow 200 for providing smart content to a user of an application.

A user 202, such as a content provider (e.g., a business), provides a content template 250 with associated annotations to server 120. Sever 120 is representative of server 120 of FIG. 1. For example, user 202 may define content template 250 via a user interface associated with server 120, and may provide rules for content template 250 in the form of annotations. In certain embodiments, user 202 provides the annotations in a domain-specific language (DSL) for defining rules. In other embodiments, user 202 provides the annotations in natural language, and the annotations are automatically processed (e.g., interpreted by content personalization engine 126 using NLP techniques) to determine rules. For example, content template 202 may define a self-help article, and the annotations may define rules for what content should be included in the self-help article and how that content should be formatted. A rule may, for example, state that if context data indicates that a user is experiencing an error with a certain error code, then a version of help content that is specific to that error code should be included in the self-help article. Another rule may state that if context data indicates that a user is located in a certain geographic region, then a version of help content that is specific to that region (e.g., based on local laws or regulations, language, or other location-specific factors) should be included in the self-help article. Content personalization engine 126 is configured to interpret annotations defining these rules, such as through a DSL or using NLP techniques. Furthermore, rules associated with content template 250 may also be associated with a plurality of other content templates, such as content templates that share one or more characteristics (e.g., geographic region, content type, and other characteristics) with content template 350.

Client 130 is representative of client 130 of FIG. 1. A request 252 for content with associated context data is sent from client 130 to server 120, such as in response to a user 204 (e.g., an existing or potential customer of user 202) requesting the content via an application. In certain examples, request 252 includes a content identifier of the requested content. Context data is generally determined by client 130 at the time of the request and is sent along with request 252 to server 120.

Server 120 receives request 252 and identifies content template 250 for the content, such as based on the content identifier, which may also be included in content template 250. Server 120 identifies rules for content template 250, such as by retrieving the annotations associated with content template 250, and evaluates the rules based on the context data. In certain embodiments, server 120 determines values for variables in content template 250 based on evaluating the rules, and generates personalized content 254 accordingly. Server 120 then provides personalized content 254 to client device 130 in response to request 252, and client 130 provides personalized content 254 to user 204. For example, personalized content 254 may be displayed to user 202 via a user interface of an application on client 130.

Example Smart Content

Figure 3:
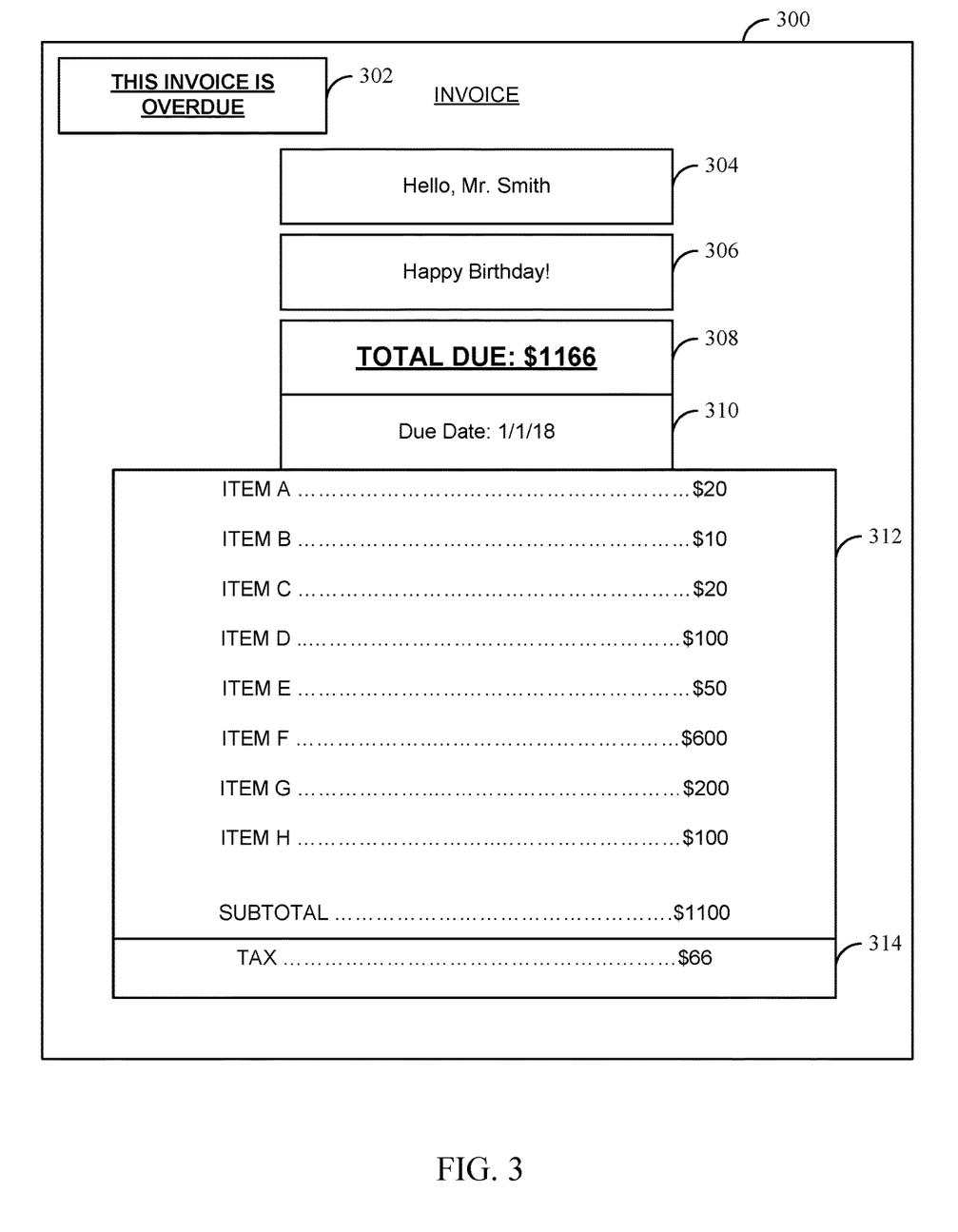
FIG. 3 depicts an example of smart content.

FIG. 3 depicts an example of smart content. Specifically, the smart content depicted in FIG. 3 is an invoice 300, which may be representative of personalized content 254 of FIG. 2.

Invoice 300 includes a plurality of items 302-314 that are personalized based on context data. For example, a user may access invoice 300 via an application on a client such as client 130 of FIGS. 1 and 2, which sends context data along with a request for invoice 300 to a server, such as server 120 of FIGS. 1 and 2. The server generates invoice 300 based on a content template by evaluating rules associated with the content template based on the context data.

Item 302 is a message that the invoice is overdue. The content template for invoice 300 includes a variable that indicates whether or not item 302 is visible, and a rule for determining a value for the variable. The rule (e.g., in an annotation to the content template) states that if the date included in the context data is greater than the due date for the invoice listed in item 310, then the value of the variable is set to "yes", indicating that the message in item 302 is visible. In this case, the context data includes a date later than Jan. 1, 2018, so the message is visible.

Item 304 includes a greeting to the user. The greeting includes variables for the title of the user and the name of the user. The title "Mr." may be determined based on the gender of the user, such as by evaluating a rule based on the context data. The name may similarly be determined (e.g., based on user attributes, which may include the user's name) such that item 304 states "Hello, Mr. Smith". A rule may state that if the user's gender and/or name cannot be determined, then a more generic greeting is included, such as simply "Hello."

Item 306 includes a greeting of "Happy Birthday," which is set to visible if the date in the context data matches the user's birthday.

Item 308 includes the total amount due. Rules associated with item 308 specify that the position, font, and formatting of variables of item 308 are determined based on the output of a machine learning model. The machine learning model is trained based on historical data to determine the best positioning, font, and formatting for the total amount due based on positions and fonts of the total amount due in historical invoices that were promptly paid by users in similar contexts. The context data is provided as an input to the trained machine learning model, which outputs values for font and position. In this example, item 308 is positioned near the top of the invoice and is presented in a large, bold, and underlined format (e.g., because this has historically resulted in invoices being paid promptly in similar contexts). The amount may be calculated based on the values in items 312 and 314.

Item 310 includes the due date for invoice 300. Item 312 includes line items listing the costs of products and/or services being invoiced, as well as a subtotal. Items 310 and 312 may be populated based on content provided by the content provider (e.g., the content provider may define the value of the due date variable and the line items for the invoice).

Item 314 includes the amount of tax due. Item 314 is determined based on a geographic location included in the context data. For example, a rule may state that the applicable tax rate is determined based on geographic location (e.g. based on local tax laws), and the amount of tax due is automatically calculated based on the applicable tax rate. The applicable tax rate may be determined, for example, by querying a government website or database, or may be based on information specified by the content provider in advance for different geographic regions. The subtotal in item 312 and the amount of tax due in item 314 are used to determine the total amount due in item 308.

Invoice 300 is provided to the user as personalized content. It is noted that, while certain embodiments involve personalized content such as invoice 300 being generated by a server and provided to a client for display to a user, aspects of the personalized content may continue to be adapted over time based on context even after the personalized content is received by the user. For example, if the user opens invoice 300 again on the day after the user's birthday, the "Happy Birthday!" message in item 306 may be removed (e.g., the visibility variable may be set to "no"). For example, the rules may be included with the personalized content, and may be evaluated by the client device on an ongoing basis in order to provide an ongoing personalized experience for the user. In these examples, the client device also includes a content personalization engine (not shown) that regularly determines updated context data and regenerates or updates the personalized content, such as at regular intervals or every time the personalized content is opened.

Figure 4:
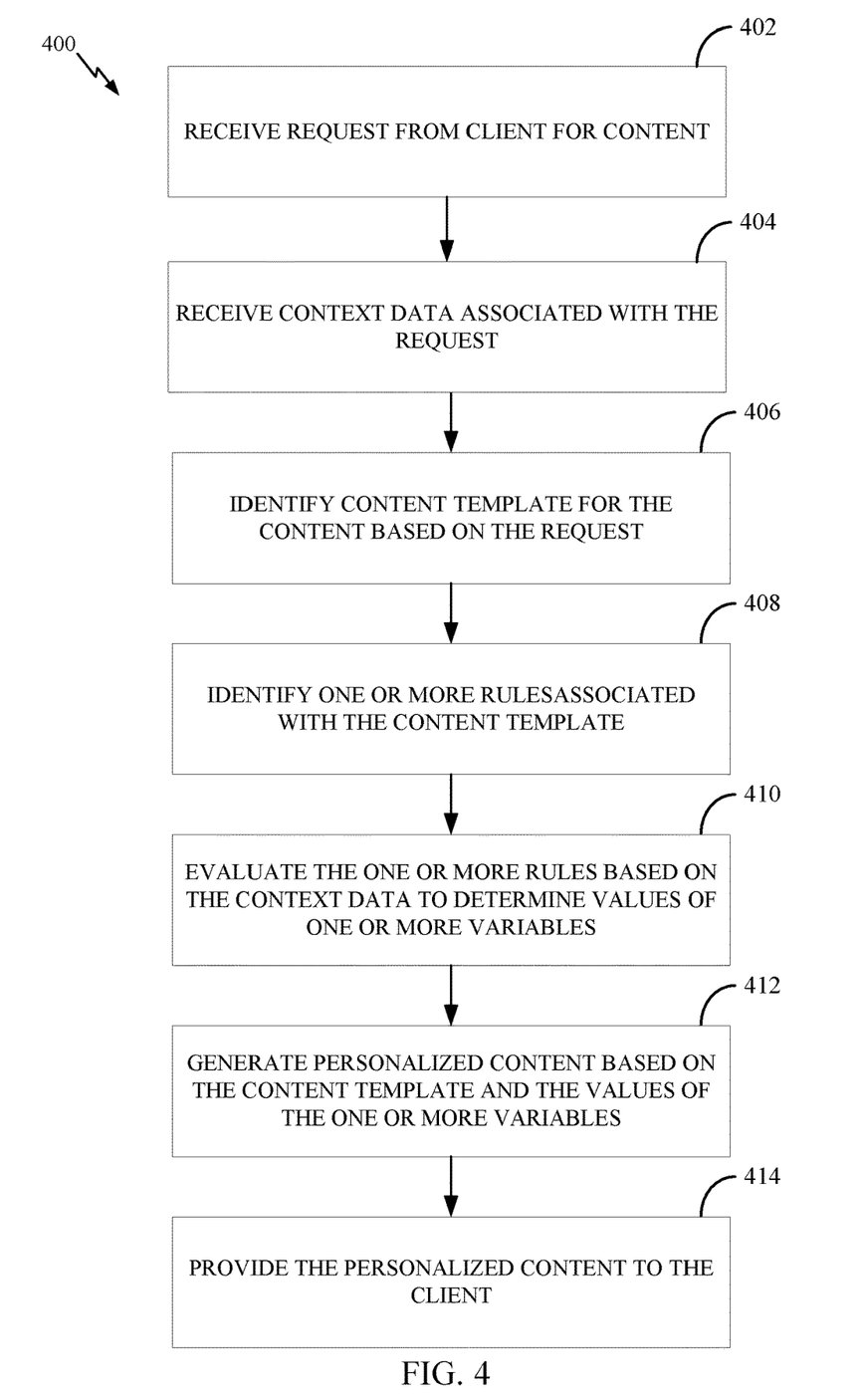
FIG. 4 depicts example operations for providing smart content to a user of an application.

FIG. 4 depicts example operations 400 for providing smart content to a user of an application. For example, operations 400 may be performed by one or more components of computing environment 100 of FIG. 1, such as content personalization engine 126.

At step 402, a request is received from a client for content. For example, the request may be received from a client device based on input from a user (e.g., accessing or requesting particular content, such as an invoice), and may include a content identifier and context data. In certain embodiments, the request also includes a specified output format, which may have been defined by the user.

At step 404 context data associated with the request is received. For example, the context data may be received from the client device as part of the request received at step 402, and may include information related to the request, such as user attributes, device capabilities and/or characteristics, date and time, and other information related to the context within which the content is requested.

At step 406, a content template for the requested content is identified based on the request. For example, the request may include a content identifier, and the content identifier may be associated with the content template.

At step 408, one or more rules associated with the content template are identified. For example, a rule may be included in metadata, such as an annotation, associated with the content template. The metadata may, for example, have been added to the content template by a content provider, such as via a user interface, and may comprise a DSL or natural language definition of a rule. In some embodiments, the rule (e.g., defined via metadata) is associated with a plurality of content templates that includes the content template. In certain embodiments, the metadata is interpreted (such as using NLP techniques or based on the DSL) to identify the rule.

At step 410, the one or more rules identified at step 408 are evaluated based on the context data in order to determine values of one or more variables associated with the content template. For example, an annotation may be processed (e.g., interpreted, such as using NLP techniques, or based on a DSL), and the rule in the annotation is evaluated based on the context data. The variable may, for example, relate to a position, font, formatting, size, or contents of an item in the content template, and the value may be determined according to the rule. It is noted that a plurality of rules are generally evaluated for any given content template. In some embodiments, a rule may involve a machine learning model, and evaluating the rule may comprise providing a subset of the context data as input to the machine learning model and receiving the value of the variable as an output from the machine learning model.

At step 412, personalized content (e.g., a personalized invoice) is generated based on the content template and the values of the one or more variables. For example, items in the content template may be populated, positioned, formatted, and/or otherwise modified based on values for a plurality of variables determined based on a plurality of rules. For example, items in the content template may be formatted based on a rule that ties formatting to device characteristics. In another example, a visibility variable is populated based on a user attribute, and the visibility variable is used to determine whether to include an item of content in the personalized content (e.g., whether the item of content should be visible). In certain embodiments, if a specified output format is included with the request, the personalized content is generated in the specified output format.

At step 414, the personalized content is provided to the client. For example, the personalized content may be displayed to the user via a user interface associated with the client or provided to the user via email or another form of communication. In some embodiments, the personalized content continues to be adapted over time as context data changes.

It is noted that operations 400 are only included as an example, and other sets of operations may be performed without departing from the scope of the present disclosure.

In some examples, an apparatus, including a memory comprising executable instructions and a processor in data communication with the memory and configured to execute the executable instructions, may be configured to cause the apparatus to perform a method for providing smart content to a user of an application, such as method 400 (or any combination of the steps described above with respect to method 400).

In some examples, a non-transitory computer-readable medium comprising instructions that when executed by a processor of an apparatus cause the apparatus to perform a method for providing smart content to a user of an application, such as method 400 (or any combination of the steps described above with respect to method 400).

Example Computing Systems

Figure 5A:
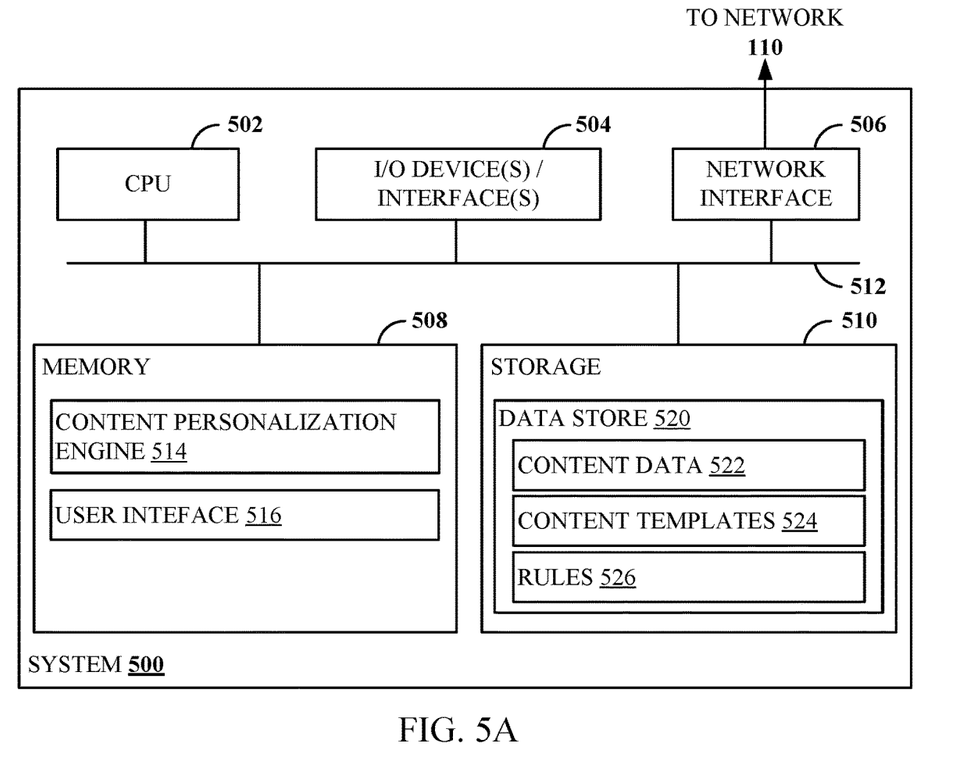
FIGS. 5A and 5B depict example computer systems with which embodiments of the present disclosure may be implemented.
Figure 5B:
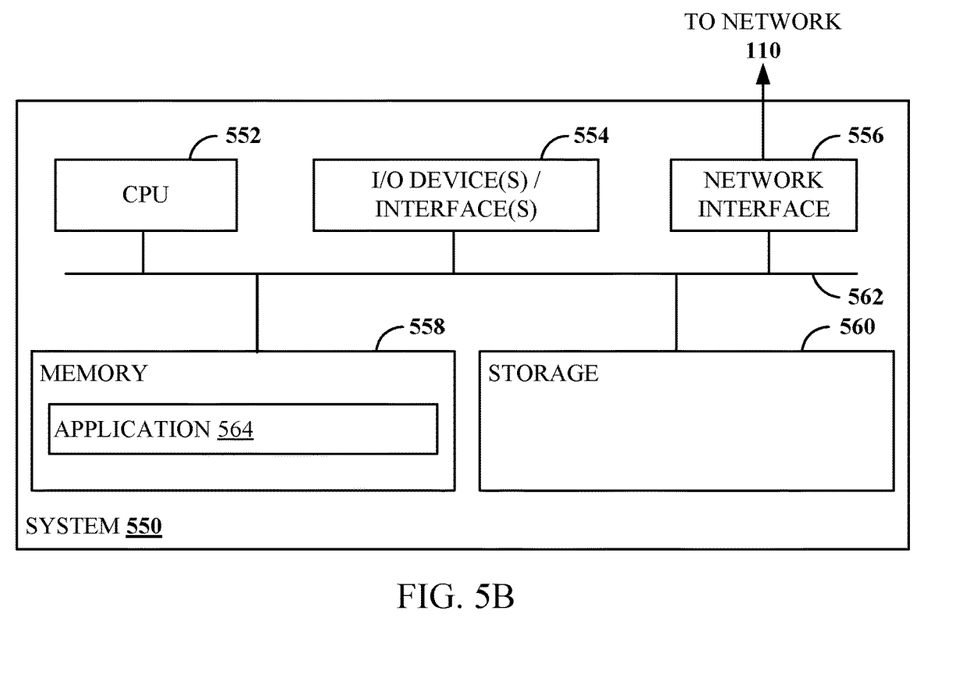

FIGS. 5A and 5B illustrate example systems 500 and 550 used for providing smart content to a user of an application.

In FIG. 5A, system 500 includes a central processing unit (CPU) 502, one or more I/O device interfaces 504 that may allow for the connection of various I/O devices 504 (e.g., keyboards, displays, mouse devices, pen input, etc.) to the system 500, network interface 506, a memory 508, storage 510, and an interconnect 512. It is contemplated that one or more components of system 500 may be located remotely and accessed via a network. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and other arrangements.

Additionally, the memory 508 is included to be representative of a random access memory.

Storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

Storage 510 comprises data store 520, which may be representative of data store 122 of FIG. 1. While data store 520 is depicted in local storage of system 500, it is noted that data store 520 may also be located remotely (e.g., at a location accessible over a network, such as the Internet). Data store 520 includes content data 522 (e.g., content for populating content templates), content templates 524 (e.g., content template 250 of FIG. 2), and rules 526 (e.g., as defined in annotations to content templates 524).

As shown, memory 508 includes content personalization engine 514 and user interface 516, which may be representative of content personalization engine 126 and UI 124 of FIG. 1. Each of these components may alternatively be located remotely.

In FIG. 5B, system 550 includes a central processing unit (CPU) 552, one or more I/O device interfaces 554 that may allow for the connection of various I/O devices 554 (e.g., keyboards, displays, mouse devices, pen input, etc.) to the system 550, network interface 556, a memory 558, storage 560, and an interconnect 562. It is contemplated that one or more components of system 550 may be located remotely and accessed via a network. It is further contemplated that one or more components of system 550 may comprise physical components or virtualized components.

CPU 552 may retrieve and execute programming instructions stored in the memory 558. Similarly, the CPU 552 may retrieve and store application data residing in the memory 558. The interconnect 562 transmits programming instructions and application data, among the CPU 552, I/O device interface 554, network interface 556, memory 558, and storage 560. CPU 552 is included to be representative of a single CPU, multiple CPUs, a single CPU having multiple processing cores, and other arrangements. Additionally, the memory 558 is included to be representative of a random access memory. Furthermore, the storage 560 may be a disk drive, solid state drive, or a collection of storage devices distributed across multiple storage systems. Although shown as a single unit, the storage 560 may be a combination of fixed and/or removable storage devices, such as fixed disc drives, removable memory cards or optical storage, network attached storage (NAS), or a storage area-network (SAN).

As shown, memory 558 includes an application 564, which may be representative of a software application through which a user of system 550 accesses a user interface, such as to access smart content as described with respect to FIGS. 1-4. Application 564 may alternatively be located remotely.

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method for providing smart content to a user device comprising a first personalization engine, the method comprising:
   storing, by a server, content, content templates and content template rules for updating the content, and a second personalization engine, and executing, by the server, the second personalization engine;
   receiving, by the server, from the user device, a request for the content, wherein the request includes a first context data of the user device, a content format, and a content identifier;
   identifying, by the server, based on the content identifier, a content template of the content templates and evaluating, by the server, the content template rules based on the first context data;
   generating, by the executing second personalization engine, personalized content by populating the content template with the content based on the evaluation;
   sending, by the server, and to the user device, the personalized content, in the content format, and the content template rules; and
   accessing, by the first personalization engine, second context data on the user device, and based on the sent content template rules and the accessed second context data, updating, by the first personalization engine, the personalized content on the user device.

2. The method of claim 1, wherein the first context data comprises characteristics of the user device, and wherein generating the personalized content comprises formatting the personalized content based on the characteristics.

3. The method of claim 1, wherein the content template includes a plurality of items and the method further comprises: modifying, by the server, a position of an item of the plurality of items based on the first context data.

4. The method of claim 1, wherein the method further includes:
   identifying, by the server, metadata associated with the content template; and
   interpreting, by the server, the metadata, which comprises interpreting one of: a domain specific language or natural language.

5. The method of claim 1, further comprising: prior to storing the content templates, receiving, by the server, the content templates from a content provider.

6. The method of claim 1, further comprising:
   receiving, by the server, input in a domain specific language, wherein the input includes a set of annotations;
   generating, by the server, a content template based on the input; and
   storing, by the server, the generated content template.

7. A system comprising:
   a user device comprising a first processor, first memory and a first personalization engine;
   a server comprising a second processor and a second memory storing executable instructions that when executed by the second processor causes the second processor to perform the steps of:
      storing content, content templates and content template rules for updating the content, and a second personalization engine, and executing the second personalization engine;
      receiving from the user device, a request for the content, wherein the request includes a first context data of the user device, a content format, and a content identifier;
      identifying based on the content identifier, a content template of the content templates and evaluating the content template rules based on the first context data;
      generating, via the executing second personalization engine, personalized content by populating the content template with the content based on the evaluation; and
      sending and to the user device, the personalized content, in the content format, and the content template rules;
   wherein the first memory further comprises executable instructions that when executed by the first processor causes the first processor to perform the steps of:
      accessing, via the first personalization engine, second context data on the user device, and based on the sent content template rules and the accessed second context data, updating, via the first personalization engine, the personalized content on the user device.

8. The system of claim 7, wherein the first context data comprises characteristics of the user device, and wherein the second memory stores additional executable instructions that when executed by the second processor causes the second processor to perform the step of: prior to generating the personalized content, formatting the personalized content based on the characteristics.

9. The system of claim 7, wherein the content template includes a plurality of items and the second memory stores additional executable instructions that when executed by the second processor causes the second processor to perform the step of:
   modifying a position of an item of the plurality of items based on the first context data.

10. The system of claim 7, wherein the second memory stores additional executable instructions that when executed by the second processor causes the second processor to perform the steps of:
  identifying metadata associated with the content template; and
  interpreting the metadata comprises interpreting one of: a domain specific language or natural language.

11. The system of claim 7, wherein the second memory stores additional executable instructions that when executed by the second processor causes the second processor to perform the step of: prior to storing the content templates, receiving the content templates from a content provider.

12. The system of claim 7, wherein the second memory stores additional executable instructions that when executed by the second processor causes the second processor to perform the steps of:
  receiving input in a domain specific language, wherein the input includes a set of annotations;
  generating a content template based on the input; and
  storing the generated content template.

\* \* \* \* \*